Nov. 24, 1959    E. J. TRUBINSKI    2,914,205
COMPARTMENTED DUMP TRUCK

Filed Oct. 7, 1957    2 Sheets-Sheet 1

INVENTOR.
Edward John Trubinski
BY
ATTORNEY

Nov. 24, 1959  E. J. TRUBINSKI  2,914,205
COMPARTMENTED DUMP TRUCK
Filed Oct. 7, 1957  2 Sheets-Sheet 2

INVENTOR.
Edward John Trubinski
BY
ATTORNEY

United States Patent Office 2,914,205
Patented Nov. 24, 1959

2,914,205

COMPARTMENTED DUMP TRUCK

Edward J. Trubinski, Merrick, N.Y.

Application October 7, 1957, Serial No. 688,529

6 Claims. (Cl. 214—518)

This invention relates to dump or disposal vehicles or trucks and, more particularly, to a novel compartmented construction therefor.

In many instances, refuse such as garbage, ashes, papers, etc. is picked up and disposed of by private contractors. In some municipalities, private or contract refuse collection supplements municipal collection services.

The costs of operating private collection services have increased to such an extent that the profit margin is substantially reduced. Such costs include capital investment in collection equipment, amortization of capital costs, labor, equipment operation and maintenance costs, and fees for the use of dumping areas. As a result of the decreasing profit margin, intensive investigations have been made of all possible sources of increased revenue or reduced costs.

One possible source of increased revenue is the sale of re-usable waste such as paper, paperboard and corrugated boxboard. However, it is not possible for general refuse collection services to take full advantage of this source of revenue due to the relatively high cost of separating salable waste from non-salable waste.

Modern dump trucks for collecting waste include a loading section pivoted on the rear of the truck body and including a receiving hopper at a low elevation into which the waste is dumped. Rotary paddles in this hopper push the waste forwardly toward the main body where the waste is engaged by a reciprocable or oscillatable pusher which packs the waste into the truck body. The loading section acts as closure for the rear of the body and, when it is desired to dump the waste, the loading section is swung to an open position as the truck body is tilted to the dumping position.

In accordance with the present invention, separation of the salable refuse from the non-salable is facilitated and made economically feasible by dividing the hopper and the truck body into two or more compartments with each hopper compartment being longitudinally aligned with a corresponding truck compartment. With this arrangement, salable refuse, such as paper, etc. can be dumped into one hopper compartment and non-salable refuse into the other hopper compartment.

Because of trade conditions, a preferred arrangement involves three hopper and body compartments. Of the three compartments, one receives waste paper, a second receives paperboard or boxboard, such as corrugated board, and the third receives non-salable refuse. The economic reason for this is that higher prices may be obtained for corrugated boxboard as compared to prices received for other waste paper.

To permit selective dumping of the salable and non-salable refuse, a sufficient number of removable body compartment closure plates are provided so that, during dumping, the back ends of all except one of the body compartments are sealed off. With a two compartment arrangement, only one closure plate is necessary, whereas two plates are necessary for a three compartment construction.

These closure plates are made of lightweight material and have a width of the order of that of the compartments and a height of the order of the body height. The plates are suitably stored in a rack secured beneath the refuse receiving hopper and the truck body. When the load is to be dumped, the loading section is first pivoted out of the way before the body is tilted. The selected compartment or compartments are then closed by hooking a closure plate to the back of the body at the upper edge thereof and then latching the lower edge of the plate to the floor of the body. When the body is tilted, only the material in the open-ended compartments will be dumped. After each use, the plates are removed and stored in the holding rack.

For an understanding of the invention principles, reference is made to the following description of a typical embodiment thereof as illustrated in the accompanying drawing. In the drawing.

Figure 1:
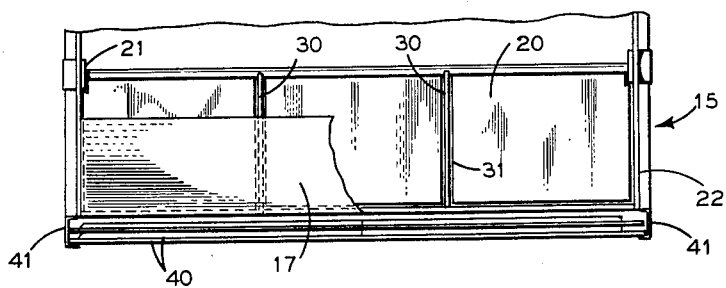
Fig. 1 is a rear elevation view of a dump truck embodying the invention.
Figure 2:
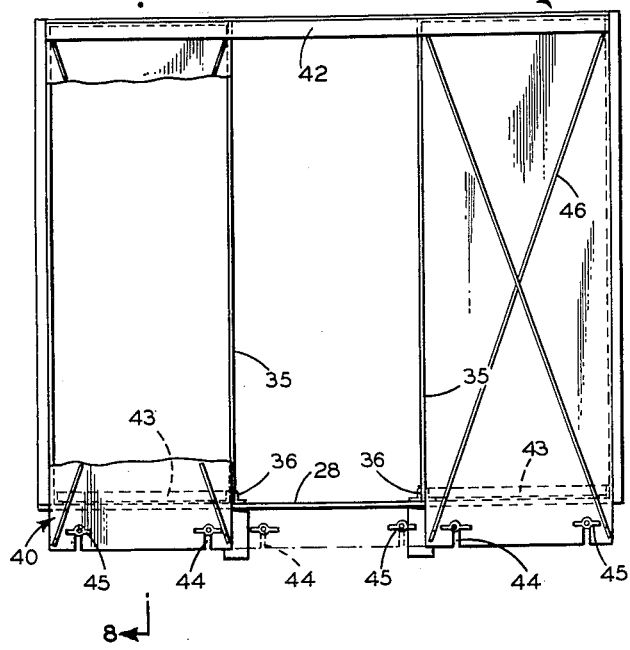
Fig. 2 is a rear elevation view of the truck body.
Figure 8:
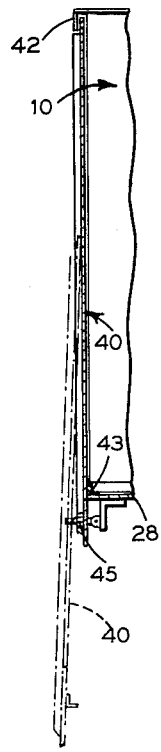
Fig. 8 is a sectional view on the line 8—8 of Fig. 2.
Figure 3:
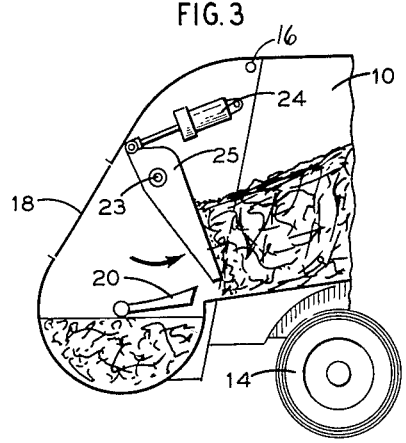
Figs. 3 through 6 are somewhat diagrammatic partial vertical sectional views illustrating the loading and packing action.

Referring to the drawing, the invention is illustrated as incorporated in a trade waste collection and dump truck comprising a body 10 tiltably supported, as at 11, upon a chassis 12 having a driving cab 13 and road wheels 14. The truck illustrated by way of example only is known as the "Load Packer 500" manufactured by Gar Wood Industries, Inc., of Wayne, Michigan, and Richmond, California.

Figure 7:
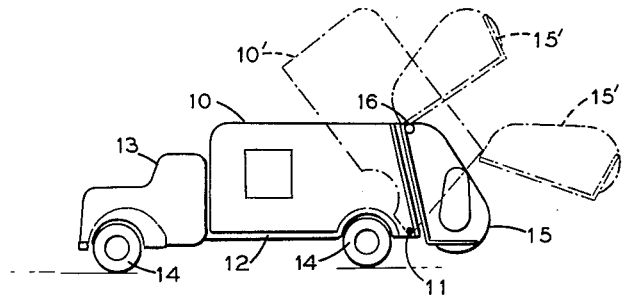
Fig. 7 is a side elevation view illustrating the dumping action.

The rear end of body 10 is open, but is normally closed by a tail gate section 15 pivoted to the rear upper edge of body 10 as at 16. Referring to Fig. 7, in dumping a load from body 10, tail gate section 15 is first swung to the position 15' relative to body 10 and then body 10 is tilted about axis 11 to the position 10'.

Referring more particularly to Figs. 3–7, tail gate section 15 has its lower end shaped to form a semi-cylindrical hopper 17 to which access is provided by raising a gate or door 18 which may be latched in the open position. A rotary panel 20 is rotatably mounted in hopper 17 on stub axles 21 on the side walls 22 of the hopper. Panel 20 cooperates with a packing panel 25 oscillatably mounted in tail gate section 15 for oscillation about an axis 23, panel 25 being powered by an actuator 24.

Figure 4:
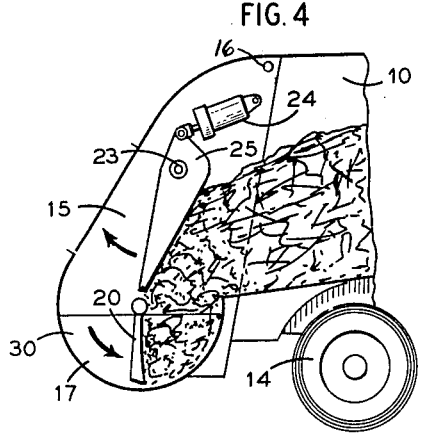

Figs. 3–6 show the cycle sequence of loading and packing. In the loading position of Fig. 3 panel 20 extends forwardly substantially horizontally so that full access is provided to hopper 17, and panel 25 is swung in against the load. When hopper 17 is fully loaded, the packing cycle is started as shown in Fig. 4. Rotary panel 20 is rotated counter-clockwise to sweep the load toward body 10, with packing panel 25 moving into the position of Fig. 4 after rotary panel 20 has moved in excess of 90 degrees from the position of Fig. 3.

Figure 5:
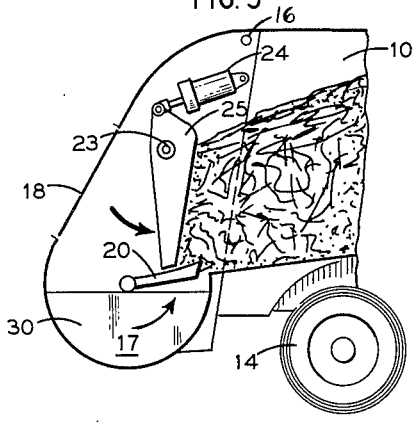
Figure 6:
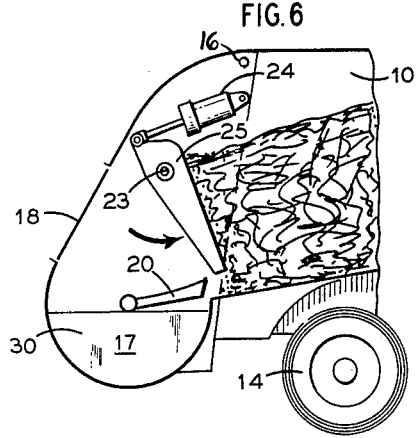

When panel 20 reaches the position of Fig. 5, panel 25 is swung counter-clockwise to sweep the load from panel 20 into body 10 and compress it against material already in the body. Panels 20 and 25 then remain in the position of Fig. 6 until the next load pick-up.

In accordance with the present invention, separation of salable from unsalable "trade waste" during loading, and subdivision of the salable trade waste if desired, is provided by dividing hopper 17 into three substantially equal width compartments by means of semi-circular partitions 30 welded or otherwise permanently secured in the hopper, the upper edges of the partitions lying somewhat below the axis of rotation of rotary panel 20. At the same time, body 10 is divided into three substantially equal width compartments by partitions 35 each aligned with a partition 30 and extending the full length and height of the body. Partitions 35 may be welded, for example, to angles 36 running along the floor, roof and front wall of the body.

To accommodate partitions 30, rotary panel 20 may be divided into three panels, each operating in a different hopper compartment, as by forming this panel with slots 31 at each partition. The load sweeping and packing operation takes place in the same manner as described for Figs. 3–7, as packing panel 25 clears the upper edges of partitions 30.

For selective dumping of the body compartments, removable closure plates 40 are provided each having substantially the width of a body compartment and somewhat longer than the height of body 10. Normally, panels or plates 40 are stored in a rack formed by a pair of channels or angles 41 secured beneath hopper 17 and body 10. To secure the plates 40 in compartment closing position, a downwardly facing channel 42 is secured along the rear of the roof of body 10. Each plate 40, at a distance from its upper edge substantially equal to the height of body 10, has an angle 43 extending along its inner surface. To place a plate 40 in position, its upper edge is set into channel 42 and the plate is swung inwardly so that angle 43 rests on body floor 28.

To lock the plates 40, pairs of screw clamps 45 are hinged to the underside of floor 28 adjacent each side of a compartment and near the rear edge of the body. The lower edge of each plate 40 is provided with a pair of downwardly opening slots 44 each aligned with a clamp 45. With a plate 40 in position and with angle 43 resting on floor 28, clamps 45 are swung up into slots 45 and tightened. These clamps 45 may be the same type as provided to draw tailgate 15 against the moisture sealing gasket around the rear edges of body 10. Plates 40 are preferably stiffened by members 46 welded across the outer surface thereof.

It should be noted that except for the compartmentation provisions and the closure plates 40 and their storage and latching means, the truck is of known construction. In effecting the compartmentation, the partitions 35 are preferably vertically aligned with the usual intermediate reinforcing members extending longitudinally beneath floor 28.

By the described construction, collection of separated trade waste can be effected by one truck and crew as compared with two trucks and crews that would otherwise be required to make separated collections of salable and non-salable waste. Generally, the salable waste is presently collected in an open top truck which may have a partition extending across its body intermediate of the ends thereof.

While a specific embodiment of the invention has been shown and described in detail to illustrate the application of the invention principles, it will be understood that the invention may be embodied otherwise without departing from such principles.

What is claimed is:

1. In a dump truck comprising a chassis, a waste material storage body tiltably mounted on said chassis for dumping of material therefrom, a tail gate pivoted to the rear end of said body for swinging movement away from said body to release material therefrom, said tail gate being formed with a loading hopper extending transversely of said body and communicating therewith, and packing means operable to move material from said hopper into said body; the improvement comprising fixed partition means dividing said hopper into compartments for separation of salable waste material from non-salable waste material; at least one partition extending longitudinally and vertically of said body, fixedly secured therein, in substantial longitudinal alignment with the hopper partition means to divide said body into corresponding compartments; and closure means selectively attachable to the rear end of said body to selectively block discharge of material from at least one selected body compartment during tilting of said body to dump material.

2. In a dump truck comprising a chassis, a waste material storage body tiltably mounted on said chassis for dumping of material therefrom, a tail gate pivoted to the rear end of said body for swinging movement away from said body to release material therefrom, said tail gate being formed with a loading hopper extending transversely of said body and communicating therewith, and packing means operable to move material from said hopper into said body; the improvement comprising fixed partition means dividing said hopper into compartments for separation of salable waste material from non-salable waste material; at least one partition extending longitudinally and vertically of said body, fixedly secured therein, in substantial longitudinal alignment with the hopper partition means to divide said body into corresponding compartments; closure means selectively attached to the rear end of said body to selectively block discharge of material from at least one selected body compartment during tilting of said body to dump material; and storage means on said truck receiving said closure means when not in operative position.

3. In a dump truck comprising a chassis, a waste material storage body tiltably mounted on said chassis for dumping of material therefrom, a tail gate pivoted to the rear end of said body for swinging movement away from said body to release material therefrom, said tail gate being formed with a loading hopper extending transversely of said body and communicating therewith, and packing means operable to move material from said hopper into said body; the improvement comprising fixed partition means dividing said hopper into compartments for separation of salable waste material from non-salable waste material; at least one partition extending longitudinally and vertically of said body, fixedly secured therein, in substantial longitudinal alignment with the hopper partition means to divide said body into corresponding compartments; closure means selectively attachable to the rear end of said body to selectively block discharge of material from at least one selected body compartment during tilting of said body to dump material; and storage means beneath said hopper receiving said closure means when not in operative position.

4. The improvement claimed in claim 1 in which said packing means comprises conjointly operable separate paddle means operating in each hopper compartment.

5. The improvement claimed in claim 1 in which said closure means comprises plates each having a length and breadth respectively substantially equal to the height and width of a body compartment, and each disengageably securable to the rear end of the body in closing relation to a body compartment.

6. The improvement claimed in claim 3 in which said closure means comprises plates each having a length and breadth respectively substantially equal to the height and width of a body compartment, and each disengageably securable to the rear end of the body in closing relation to a body compartment.

References Cited in the file of this patent

UNITED STATES PATENTS

| | | |
|---|---|---|
| 2,335,155 | Lee | Nov. 23, 1943 |
| 2,370,427 | Sherry | Feb. 27, 1945 |
| 2,606,675 | Jones | Aug. 12, 1952 |